(12) United States Patent
Bapat et al.

(10) Patent No.: US 11,240,686 B2
(45) Date of Patent: Feb. 1, 2022

(54) DYNAMIC SECTORIZATION IN A SYSTEM WITH MULTIPLE CLOUD RADIO ACCESS NETWORKS

(71) Applicant: CommScope Technologies LLC, Hickory, NC (US)

(72) Inventors: Anil Bapat, Bangalore (IN); Naveen Shanmugaraju, Bangalore (IN)

(73) Assignee: CommScope Technologies LLC, Hickory, NC (US)

(*) Notice: Subject to any disclaimer, the term of this patent is extended or adjusted under 35 U.S.C. 154(b) by 99 days.

(21) Appl. No.: 16/674,566

(22) Filed: Nov. 5, 2019

(65) Prior Publication Data
US 2020/0162941 A1    May 21, 2020

Related U.S. Application Data

(60) Provisional application No. 62/768,879, filed on Nov. 17, 2018.

(51) Int. Cl.
| | |
|---|---|
| *H04W 16/02* | (2009.01) |
| *H04W 16/18* | (2009.01) |
| *H04L 25/02* | (2006.01) |
| *H04W 24/02* | (2009.01) |
| *H04L 12/24* | (2006.01) |

(Continued)

(52) U.S. Cl.
CPC ......... *H04W 24/02* (2013.01); *H04L 25/0212* (2013.01); *H04L 25/0228* (2013.01); *H04L 41/145* (2013.01); *H04L 41/16* (2013.01); *H04L 43/045* (2013.01); *H04W 16/18* (2013.01); *H04W 36/00837* (2018.08)

(58) Field of Classification Search
None
See application file for complete search history.

(56) References Cited

U.S. PATENT DOCUMENTS

| 10,348,386 B1* | 7/2019 | Nammi | H04B 7/043 |
| 10,560,759 B1* | 2/2020 | Liu | H04N 21/6587 |

(Continued)

OTHER PUBLICATIONS

International Searching Authority, "International Search Report and Written Opinion from PCT Application No. PCT/US2019/059911", from Foreign Counterpart to U.S. Appl. No. 16/674,566, filed Feb. 24, 2020, pp. 1-8, Published: WO.

(Continued)

*Primary Examiner* — Duc T Duong
(74) *Attorney, Agent, or Firm* — Fogg & Powers LLC

(57) ABSTRACT

A communication system is disclosed. The communication system includes a plurality of cloud radio access networks (C-RANs), each C-RAN comprising a baseband controller and a plurality of radio points (RPs). Each RP in the plurality of C-RANs is located at a site and is configured to exchange radio frequency (RF) signals with a plurality of wireless devices at the site. The communication system also includes a dynamic sectorization system communicatively coupled to each baseband controller. The dynamic sectorization system is configured to determine at least one signature vector for each of the wireless devices at the site. The dynamic sectorization system also is configured to map each RP in the plurality of C-RANs to one of a number of sectors (K) based on the at least one signature vector for each of the wireless devices at the site.

20 Claims, 8 Drawing Sheets

(51) Int. Cl.
*H04W 36/00* (2009.01)
*H04L 12/26* (2006.01)

(56) References Cited

U.S. PATENT DOCUMENTS

| | | | |
|---|---|---|---|
| 2011/0143807 | A1 | 6/2011 | Aue et al. |
| 2013/0229992 | A1 | 9/2013 | Yue et al. |
| 2013/0286954 | A1* | 10/2013 | Ma ................... H04B 7/024 370/329 |
| 2014/0031049 | A1* | 1/2014 | Sundaresan ......... H04W 84/042 455/447 |
| 2014/0113643 | A1* | 4/2014 | Ma ................... H04B 7/024 455/452.1 |
| 2015/0071170 | A1* | 3/2015 | Zhang ................ H04W 48/17 370/328 |
| 2015/0244430 | A1 | 8/2015 | Shattil |
| 2016/0119087 | A1 | 4/2016 | Rost et al. |
| 2016/0316479 | A1* | 10/2016 | Choi ................. H04W 72/085 |
| 2017/0164215 | A1* | 6/2017 | Chen ................. H04W 16/10 |
| 2018/0095787 | A1* | 4/2018 | Oechsner ............ H04W 36/22 |
| 2020/0228998 | A1* | 7/2020 | Bai .................. H04W 16/18 |
| 2021/0051501 | A1* | 2/2021 | Koudouridis ..... H04W 72/0406 |
| 2021/0075687 | A1* | 3/2021 | Lou .................. H04W 24/06 |

OTHER PUBLICATIONS

Raghothaman, Balaji B, "Location Determination in a Cloud Radio Access Network Utilizing Mage Data", U.S. Appl. No. 16/783,479, filed Feb. 6, 2020, pp. 1-45, Published: US.
3GPP, "3rd Generation Partnership Project; Technical Specification Group Radio Access Network; Study on new radio access technology: Radio access architecture and interfaces (Release 14)", 3GPP TR 38.801 V14.0.0, Mar. 2017, pp. 1-91, 3GPP.
Bapat, Anil et al., "Location Determination With a Cloud Radio Access Network", U.S. Appl. No. 16/674,547, filed Nov. 5, 2019, pp. 1-47, Published: US.
Shanmugaraju, Naveen et al., "Dynamic Quantized Signature Vector Selection for a Cloud Radio Access Network", U.S. Appl. No. 16/674,587, filed Nov. 5, 2019, pp. 1-42, Published: US.
Hagen et al., "New Spectral Methods for Ratio Cut Partitioning and Clustering", IEEE Transactions on Computer-Aided Design, Sep. 1992, pp. 1074-1085, vol. 11, No. 9, IEEE.

* cited by examiner

DYNAMIC SECTORIZATION IN A SYSTEM WITH MULTIPLE CLOUD RADIO ACCESS NETWORKS

CROSS-REFERENCE TO RELATED APPLICATIONS

This application claims the benefit of U.S. Provisional Patent Application Ser. No. 62/768,879 filed on Nov. 17, 2018, entitled "DYNAMIC SECTORIZATION IN A SYSTEM WITH MULTIPLE CLOUD RADIO ACCESS NETWORKS", the entirety of which is incorporated herein by reference.

BACKGROUND

In large deployments, multiple cloud radio access networks (C-RANs) may be statically deployed next to each other at a site. This may cause problems, such as frequent handovers and inter-cell interference. Accordingly, the present systems and methods describe dynamic sectorization in a system with multiple cloud radio access networks (C-RANs).

SUMMARY

A communication system is disclosed. The communication system includes a plurality of cloud radio access networks (C-RANs), each C-RAN comprising a baseband controller and a plurality of radio points (RPs). Each RP in the plurality of C-RANs is located at a site and is configured to exchange radio frequency (RF) signals with a plurality of wireless devices at the site. The communication system also includes a dynamic sectorization system communicatively coupled to each baseband controller. The dynamic sectorization system is configured to determine at least one signature vector for each of the wireless devices at the site. The dynamic sectorization system also is configured to map each RP in the plurality of C-RANs to one of a number of sectors (K) based on the at least one signature vector for each of the wireless devices at the site.

DRAWINGS

Understanding that the drawings depict only exemplary configurations and are not therefore to be considered limiting in scope, the exemplary configurations will be described with additional specificity and detail through the use of the accompanying drawings, in which.

Figure 5A:
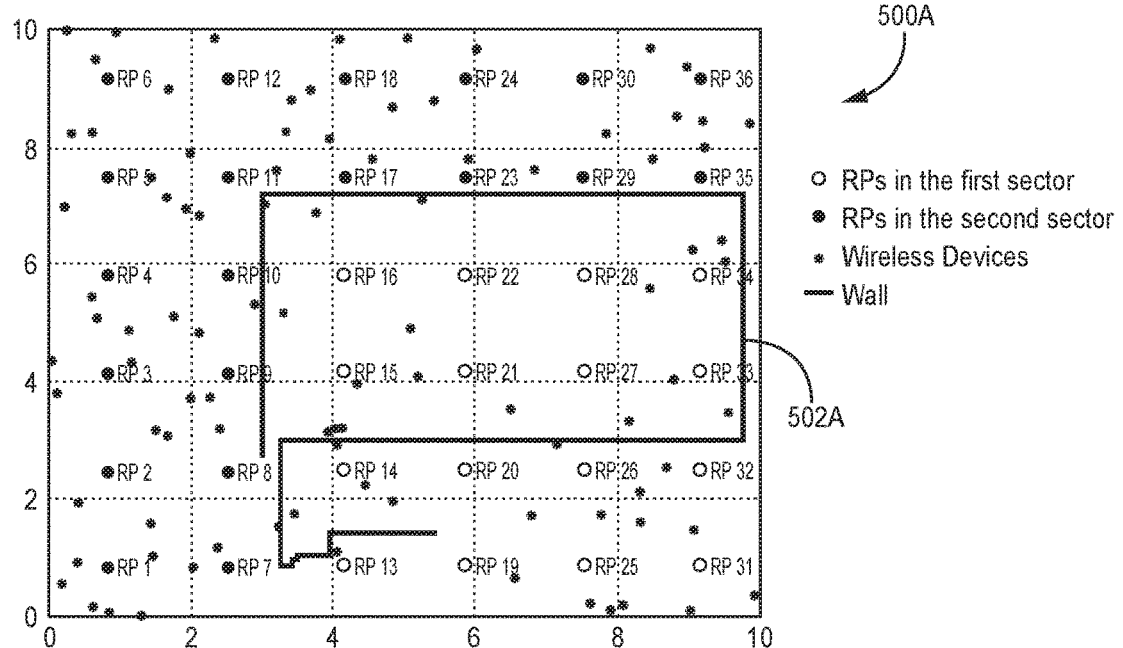
FIG. 5A is a grid diagram illustrating graph partitioning in a grid with 36 RPs and 100 wireless devices that are uniformly distributed.
Figure 5B:
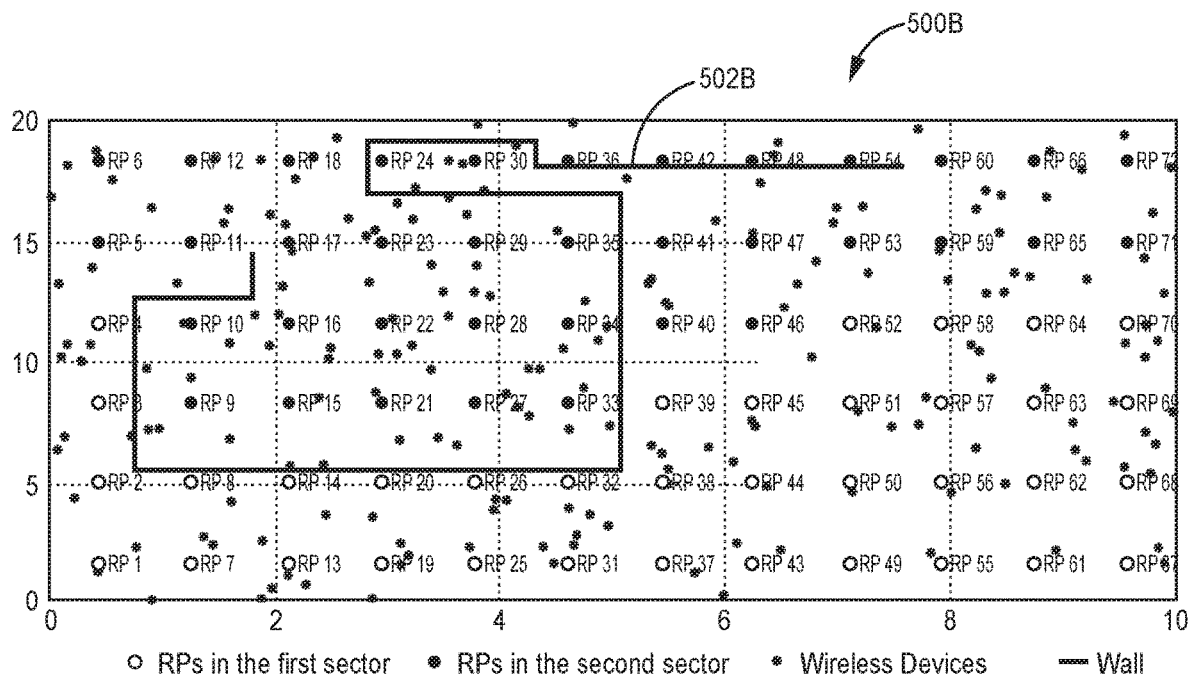
Figure 5C:
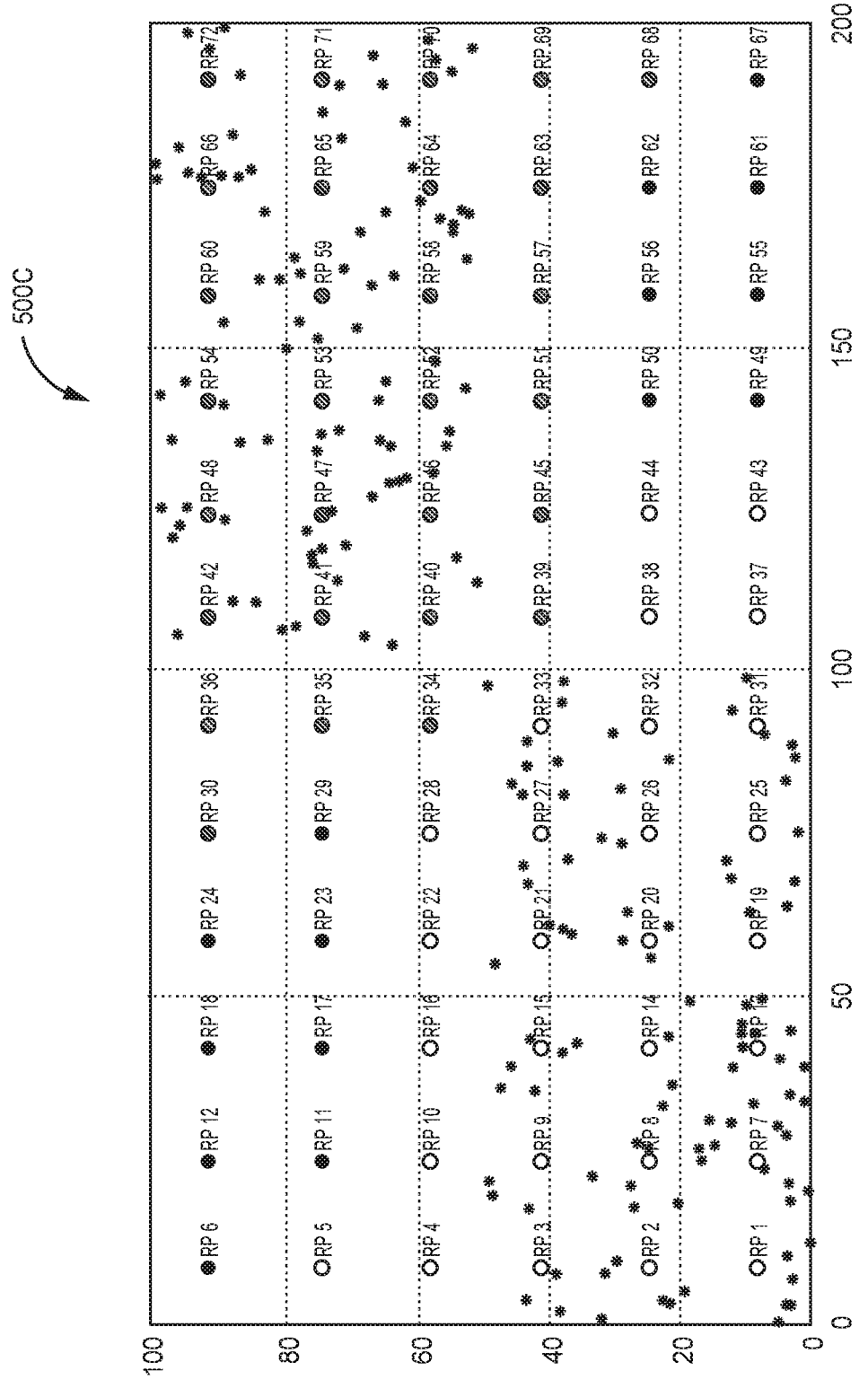

FIG. 5B is a grid diagram illustrating graph partitioning in a grid with 72 RPs and 200 wireless devices that are uniformly distributed; and FIG. 5C is a grid diagram illustrating graph partitioning in a grid with 72 RPs and 200 wireless devices that are non-uniformly distributed.

In accordance with common practice, the various described features are not drawn to scale but are drawn to emphasize specific features relevant to the exemplary configurations.

DETAILED DESCRIPTION

A cloud radio access network (C-RAN) is a point-to-multipoint distributed base station with one or more baseband controllers that are physically separated from multiple radio points. In the configurations discussed herein, it is assumed that each baseband controller (and each C-RAN) serves one sector, however, other configurations are possible in which a single baseband controller (in a C-RAN) serves more than one sector or multiple baseband controllers serve a single sector, e.g., in response to high or low demand for capacity.

Each C-RAN may have a limited capacity, e.g., 1,000 connected users. In larger deployments where more users are anticipated, multiple C-RANs may be needed to provide wireless service to the entire deployment site. Conventionally, for large deployments, sectors (each C-RAN serving one sector) may be statically located next to one another to cover an entire deployment site. Each sector within the deployment may be served by a single baseband controller and many radio points (e.g., anywhere from 10 to 128 radio points per baseband controller) connected to that baseband controller (and covering the entire sector area). In other words, multiple C-RANs (each having one baseband controller and many radio points) may be located next to one another in large deployments, each one forming a single sector.

However, there are several problems with statically locating multiple C-RANs (each serving a respective sector) next to each other. Specifically, multiple static, adjacent sectors may cause (1) frequent handovers when users move across sector boundaries; and/or (2) inter-sector interference for users at the sector edges. Therefore, when multiple C-RANs are deployed next to each other in large deployments, the increased handovers and inter-sector interference may reduce network performance and user experience, particularly at sector boundaries.

Accordingly, the present systems and methods describe dynamic sectorization in a system with multiple C-RANs. Specifically, using the distributed C-RAN architecture, sectors across multiple C-RANs may be dynamically changed by "re-homing" the radio points to different baseband controllers. In this way, the sector boundaries of the C-RAN(s) at a deployment may be adjusted dynamically. Dynamic sectorization may mitigate the effects of too many handovers and inter-sector interference in a deployment, e.g., multi-sector and/or multi-C-RAN deployment.

In order to determine the most appropriate sector boundaries at any given point in time, clustering of radio points into multiple sectors may be performed based on signature vectors (SVs) gathered from the radio points. One unsupervised machine-learning approach is K-means clustering.

Alternatively or additionally, a graph partitioning approach may be used to map RPs to sectors.

Figure 1A:
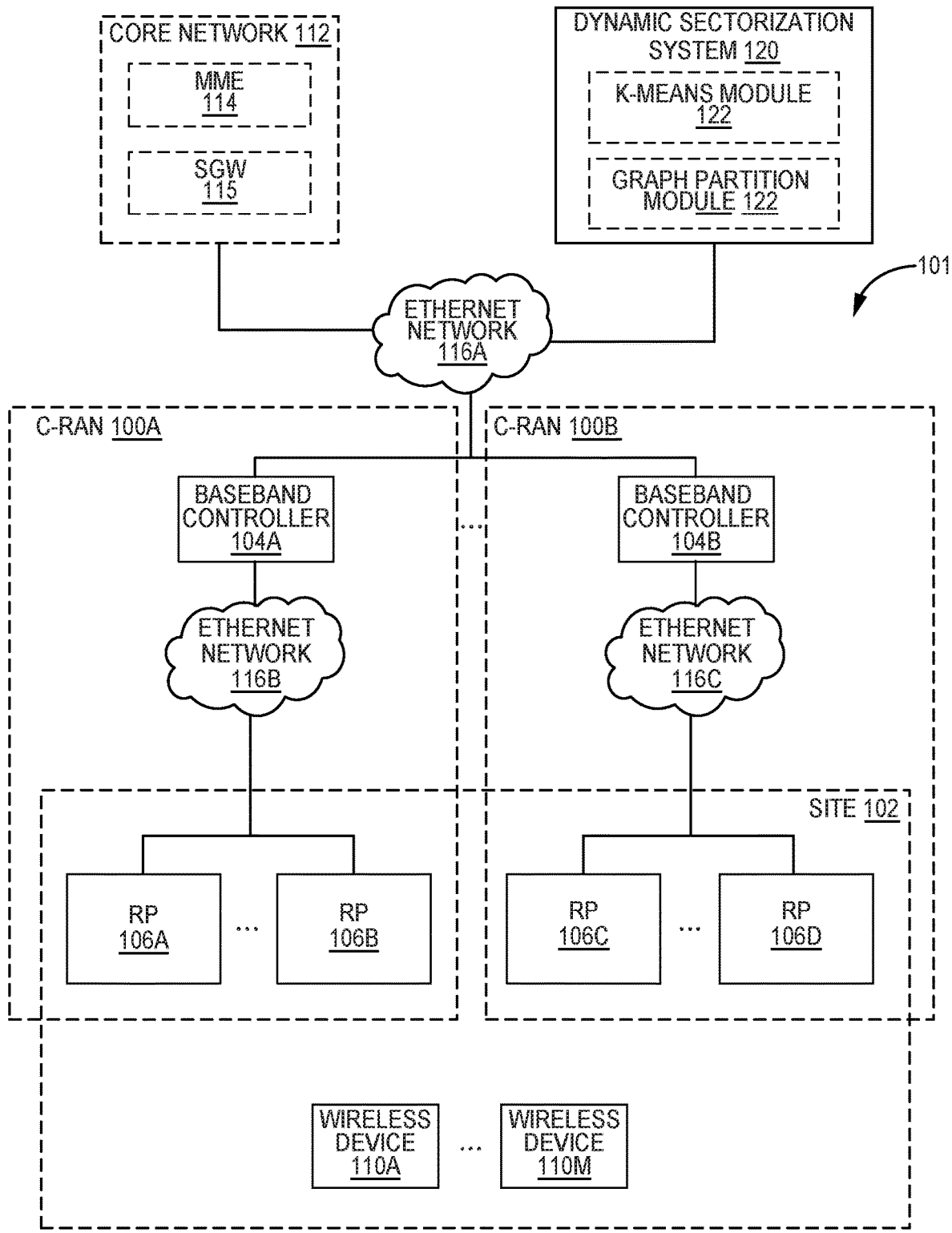
FIG. 1A is a block diagram illustrating an exemplary configuration of a system with multiple cloud radio access networks (C-RANs) that performs dynamic sectorization.

FIG. 1A is a block diagram illustrating an exemplary configuration of a system 101 with multiple cloud radio access networks (C-RANs) 100A-B that performs dynamic sectorization. Although two C-RANs 100 are illustrated in FIG. 1A, any number of C-RANs 100 may be installed next to each other. As used herein, the term "sectorization" includes determining, implementing, and/or changing sector boundaries for at least one C-RAN 100. The term "dynamic" refers to the sectorization being performed during runtime based on actual conditions in the system 101, e.g., after initial sectorization.

The example C-RANs 100 in FIG. 1A may be deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area).

In the exemplary configuration shown in FIG. 1A, each C-RAN 100 includes a single baseband unit 104A-B and multiple radio points (RPs) 106A-D. For example, a first baseband unit 104A may serve (and communicate with) a first set of RPs 106A-B, while a second baseband unit 104B may serve (and communicate with) a second set of RPs 106C-D. In some configurations, each baseband unit 104 implements a single sector. Each C-RAN 100 may include any number of RPs 106, e.g., anywhere from 10 to 128.

Each C-RAN 100 may also be referred to as a "C-RAN," "C-RAN system," and/or an "eNodeB" (or "eNB"). Each baseband unit 104 may also referred to as a "baseband controller" 104 or just "controller" 104. Each RP 106 may include or be coupled to at least one (e.g., two) antennas via which downlink RF signals are radiated to wireless devices 110A-M and via which uplink RF signals transmitted by wireless devices 110 are received.

It should be noted that the baseband controllers 104 may or may not be located at the site 102 (with the RPs 106 it serves). In one configuration, the baseband controllers 104 may be physically located remote from the RPs 106, and the baseband controllers 104 may optionally be located together in a central location. In some configurations, the RPs 106 are physically separated from each other within the site 102, although they are each communicatively coupled to the baseband controller 104 serving them.

Each wireless device 110 may be a computing device with a processor that executes instructions stored in memory, e.g., a mobile phone, tablet computer, mobile media device, mobile gaming device, laptop computer, vehicle-based computer, a desktop computer, etc. It should be noted that any number of wireless devices 110 may be present at the site 102.

The C-RANs 100 may be coupled to the core network 112 of each wireless network operator over an appropriate back-haul ETHERNET network 116A. For example, the Internet may be used for back-haul between the C-RANs 100 and each core network 112. However, it is to be understood that the back-haul ETHERNET network 116A can be implemented in other ways. The ETHERNET networks 116 described herein may be implemented with one or more switches, routers, and/or other networking devices.

In one configuration, the C-RANs 100 may be implemented as a Long-Term Evolution (LTE) radio access network providing wireless service using an LTE air interface. However, it should be noted that the present systems and methods may be used with other wireless protocols, e.g., 5G. LTE is a standard developed by 3GPP standards organization. In this configuration, each baseband controller 104 and its respective RPs 106 together may be used to implement an LTE Evolved Node B (also referred to here as an "eNodeB" or "eNB"). An eNB may be used to provide wireless devices 110 with mobile access to the wireless network operator's core network 112 to enable wireless device 110 to wirelessly communicate data and voice (using, for example, Voice over LTE (VoLTE) technology).

Also, in an exemplary LTE configuration, each core network 112 may be implemented as an Evolved Packet Core (EPC) 112 comprising standard LTE EPC network elements such as, for example, a mobility management entity (MME) 114 and a Serving Gateway (SGW) 115 and, optionally, a Home eNB gateway (HeNB GW) (not shown) and a Security Gateway (SeGW) (not shown).

Moreover, in an exemplary LTE configuration, each baseband controller 104 may communicate with the MME 114 and SGW 115 in the EPC core network 112 using the LTE S1 interface and communicates with eNBs using the LTE X2 interface. For example, the baseband controllers 104 can communicate with outdoor macro eNB(s) (not shown) via the LTE X2 interface.

Each baseband controller 104 and radio point 106 may be implemented so as to use an air interface that supports one or more of frequency-division duplexing (FDD) and/or time-division duplexing (TDD). Also, the baseband controllers 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, each baseband controller 104 and the radio points 106 it serves can implement one or more of the LTE transmission modes. Moreover, each baseband controller 104 and the radio points 106 it serves can be configured to support multiple air interfaces and/or to support multiple wireless operators.

In the exemplary configuration shown in FIG. 1A, the front-haul that communicatively couples each baseband controller 104 to the one or more RPs 106 is implemented using a standard ETHERNET network 116B-C. However, it is to be understood that the front-haul between a baseband controller 104 and the RPs 106 it serves can be implemented in other ways. Furthermore, in some configurations, different C-RANs 100 may share the same the front-haul ETHERNET network.

The Third Generation Partnership Project (3GPP) has adopted a layered model for the LTE radio access interface. Generally, the baseband controller 104 and/or the RPs 106 in a C-RAN 100 perform analog radio frequency (RF) functions for the air interface as well as digital Layer 1, Layer 2, and Layer 3 (of the 3GPP-defined LTE radio access interface protocol) functions for the air interface.

In one example, each baseband controller 104 comprises Layer 3 (L3) functionality, Layer 2 (L2) functionality, and Layer 1 (L1) functionality configured to perform at least some of the L3 processing, L2 processing, and L1 processing, respectively, for the LTE air interface implemented by the C-RAN 100, and each RP 106 includes (optionally) L1 functionality that implements any L1 processing for the air interface that is not performed in a baseband controller 104 and one or more radio frequency (RF) circuits that implement the RF front-end functions for the air interface and the one or more antennas associated with that RP 106.

Other possible functional splits between each baseband controller 104/RPs 106 of the L1-L3 processing for the air interface include: (1) all L1-L3 processing in baseband controller 104; (2) all L2 and L3 processing in baseband controller 104/all L1 processing in RPs 106; (3) all L3 and some L2 processing in baseband controller 104/all L1 and some L2 processing in RPs 106; (4) all L3 processing in baseband controller 104/all L1-L2 processing in RPs; (5) some L3 processing in baseband controller 104/some L3 and all L1-L2 processing in the RPs 106. In some configurations, all RF front-end processing for the air interface and the one or more antennas is performed in the RPs 106, e.g., the baseband controllers 104 do not perform any RF processing for the air interface or the antennas (although other configurations are possible).

In some configurations (e.g., where all the L1-L3 processing is performed in a baseband controller 104), IQ data representing time-domain symbols for the air interface is communicated between a baseband controller 104 and the RPs 106 it serves. Communicating such time-domain IQ data typically requires a relatively high data rate front haul. This approach (communicating time-domain IQ data over the front haul) is suitable for those implementations where the front-haul ETHERNET network 116B-C is able to deliver the required high data rate.

If the front-haul ETHERNET network 116B-C is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between a baseband controller 104 and the RPs 106 it serves. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 116B-C.

Where frequency-domain IQ data is front-hauled between a baseband controller 104 and the RPs 106 it serves, each baseband controller 104 can be configured to perform all or some of the digital L3, L2, and L1 processing for the air interface. In this case, the L1 functions in each RP 106 can be configured to implement the digital L1 processing for the air interface that is not performed in a baseband controller 104. For example, in this exemplary configuration, each baseband controller 104 may implement a receiver and a scheduler for the cell.

Where the front-haul ETHERNET network 116B-C is not able to deliver the data rate need to front haul (uncompressed) time-domain IQ data, the time-domain IQ data can be compressed prior to being communicated over the ETHERNET network 116B-C, thereby reducing the data rate needed communicate such IQ data over the ETHERNET network 116B-C.

Data can be front-hauled between a baseband controller 104 and the RPs 106 it serves in other ways (for example, using front-haul interfaces and techniques specified in the Common Public Radio Interface (CPRI) and/or Open Base Station Architecture Initiative (OB SAI) family of specifications).

Although not shown, a management system may be communicatively coupled to a baseband controller 104 and the RPs 106 it serves, for example, via the ETHERNET network 116A and the ETHERNET network 116B-C (in the case of the RPs 106). The management system may send and receive management communications to and from each baseband controller 104, each of which in turn forwards relevant management communications to and from the RPs 106 it serves.

As illustrated in FIG. 1A, multiple C-RANs 100 may be installed next to each other in large deployments, and each C-RAN 100 may include many RPs 106 (e.g., up to 128) that are served by one (but optionally more than one) baseband controller 104. The coverage areas of individual baseband controllers 104 of a C-RAN 100 cluster may be adapted dynamically, based on actual field conditions (e.g., inter-cell interference, user handover rate etc.) to significantly improve user experience, e.g., by minimizing inter-sector handovers and/or inter-sector interference. Dynamic sectorization may be additionally beneficial because it may help distribute the computational capacity of a cluster of baseband controllers 104 (serving a cluster of C-RANs 100), e.g., in large deployments covering a large region and/or having uneven capacity requirements. By changing the association between at least one RP 106 and the serving baseband controller(s) 104 ("re-homing" at least one RP 106), the sector areas covered by each baseband controller 104 may be dynamically varied.

A dynamic sectorization system 120 may be communicatively coupled to each baseband controller 104 (e.g., via the ETHERNET network 116A) and the RPs 106 it serves (e.g., via the ETHERNET network 116B-C). The dynamic sectorization system 120 may be implemented using one or more computing devices (and/or physical housings), each computing device with one or more processors, e.g., graphics processing unit(s) (GPU(s)), reduced instruction set computing(s) (RISC(s)), special purpose microprocessor(s) (e.g., digital signal processor(s) (DSP(s))), microcontroller(s), programmable gate array(s), Field Programmable Gate Array(s) (FGPA(s)), application specific integrated circuit(s) (ASIC(s)), etc.

In one configuration, the dynamic sectorization system 120 may be a data cluster (with multiple (e.g., 15 or 16) computing devices) with GPU resources for running machine-learning algorithms at scale. The dynamic sectorization system 120 may provide other data-driven optimizations and solutions, in addition to dynamic sectorization.

The dynamic sectorization system 120 may include a K-means module 122 and/or a graph partition module 124. The K-means module 122 may be implemented in a machine-learning library (e.g., SparkML) that performs "distributed" processing on large datasets. The K-means module 122 may perform K-means clustering in a distributed manner (utilizing all the processing nodes in a cluster of machines in parallel).

The K-means module 122 may cluster the RPs 106 (across multiple C-RANs 100) into K sectors. Clustering the RPs 106 into K sectors may include re-homing at least one RP 106 from a first baseband controller 104A in a first C-RAN 100A to a second baseband controller 104B in a second C-RAN 100B. The clustering may be performed on the basis of data (called "signature vectors") that are based on one or more operating conditions in the C-RANs 100, e.g., a signature vector can be based on at least one signal and/or channel metric measured at multiple RPs 106. Each signature vector may be strongly correlated to the physical location of the wireless device 110 within the deployment area (e.g., site 102).

Alternatively, the graph partition module 124 may use another approach to form and/or change sector boundaries. The graph partition module 124 may determine sector boundaries based on signature vectors (SVs) and/or quantized signature vectors (QSVs).

An RP 106 may be homed to the first baseband controller 104A by programming the RP 106 with the Internet Protocol (IP) address of the first baseband controller 104A. Additionally, the RP 106 may be re-homed to a second baseband controller 104B by changing the IP address that is programmed on the RP 106 from the first baseband controller 104A to the second baseband controller 104B. Therefore, sector boundaries among multiple C-RANs 100 may be dynamically changed by re-homing one or more RPs 106, e.g., in response to the current distribution of users or other operating conditions at the site 102.

For example, before dynamic sectorization, a first RP 106A and a second RP 106B may be served by the first baseband controller 104A (implementing a first sector), while a third RP 106C and a fourth RP 106D may be served by the second baseband controller 104B (implementing a second sector). After dynamic sectorization, however, the first RP 106A and the third RP 106C may be served by the first baseband controller 104A (implementing the first sector), while the second RP 106B and the fourth RP 106D may be served by the second baseband controller 104B (implementing the first sector).

Therefore, the dynamic sectorization may include determining that one or more RPs 106 should be re-homed from a current baseband controller 104 to a new baseband controller 104 and instructing the current baseband controller 104 to instruct the RP(s) 106 to re-home to the new baseband controller 104. In addition to programming the RP(s) 106 with the IP address of the new baseband controller 104, a handshake procedure may be performed between each RP 106 and the new baseband controller 104, which programs RP(s) 106 with current operational parameters to use after re-homing is complete. The current operational parameters may include the E-UTRA Absolute Radio Frequency Channel Number (EARFCN) to be used, the cell ID for the new sector, the transmit power value, the downlink bandwidth available from the new baseband controller 104, and/or the uplink bandwidth available to the new baseband controller 104. The handshake procedure may include the new baseband controller 104 sending a message (that includes the current operational parameters) to each RP 106 being re-homed to the new baseband controller 104. The RPs 106 may also be enabled as part of the re-homing procedure, e.g., caused to start transmitting over the air interface using the current operational parameters.

The signature vectors used during dynamic sectorization may be determined using Sounding Reference Signals (SRSs) or any other type (or combination) of signal received at the RPs 106 from the wireless device(s) 110. In one configuration, a signature vector may be determined for each combination of wireless device 110 and RP 106 (that receives wireless signals from the wireless device 110) in the system 101.

For example, each wireless device 110 (e.g., LTE device) may periodically transmit an SRS on the uplink. For example, each wireless device 110 may transmit SRS once every 80 ms or every 160 ms, e.g., the interval may be determined dynamically based on the load on the C-RAN 100. In other words, each wireless device 110 connected to the C-RAN 100 may transmit an SRS every 80-160 ms. Alternatively, other SRS intervals may be used in the C-RAN 100.

The RPs 106 may be strategically located across the entire site 102 to provide optimal coverage to most (or all) physical locations in the site 102. In some configurations, each of the RPs 106 receives an SRS from each of the connected wireless devices 110 and report at least one metric to the baseband controller 104 serving it. The signature vectors may be determined using any number of metrics derived from the SRS received at the RPs 106, also called "SRS metrics" herein. The SRS metric(s) extracted by each receiving RP 106 may be used (by a baseband controller 104) to determine a signature vector. SRS metrics may be based on one or more of the following: (1) an SRS power measurement; (2) a channel impulse response for the wireless device 110, e.g., measured from an SRS; (3) an angle of arrival for the SRS; and/or (4) at least one previous signature vector for the wireless device 110. In some configurations, each signature vector may be determined using the SRS power of an SRS and the channel impulse response for the SRS (from a particular wireless device 110), but no other SRS metrics.

A channel impulse response may be determined for a wireless device 110 as follows. Uplink signals (e.g., SRS) sent by a wireless device 110 may reach the RPs 106 over multiple paths, which leads to multiple signal amplitudes measured with small delays. So, each RP 106 may measure these various signal amplitudes as well as the delay times and form a vector of these measurements, which is the channel impulse response of the SRS signal. Channel impulse response measurements of a wireless device's 110 SRS signal from all the RPs 106 in the site 102 may be strongly correlated with the user's pinpointed location, taking into effect both the distances of the wireless device 110 from each RP 106 as well as the unique multipath characteristics of that particular location of the wireless device 110 relative to each RP 106.

The signature vectors described herein may optionally be used to determine an RP 106 having the best signal reception metric for a wireless device 110, e.g., by scanning or sorting the elements of the signature vector to find the element having the best signal reception metric. The RP 106 that corresponds to that "best" element may also referred to as the "primary RP" 106 for the wireless device 110. Furthermore, a secondary cell signature vector may be determined, at least partially, based on a primary cell signature vector and a physical location for a wireless device 110.

A "quantized signature vector" (QSV) may be determined for a wireless device 110, e.g., based on one or more signature vectors. A "simulcast zone" may be a subset of RPs 106 in a C-RAN 100 that are used to transmit to a wireless device 110, e.g., each wireless device 110 may have a simulcast zone that may or may not overlap with a simulcast zone for another wireless device 110. The QSV for each wireless device 110, then, may be a vector that includes an element for each RP 106, where each element has one of a finite set of values. For example, the element for each RP 106 has a first value (for example, a value of "1") if the corresponding RP 106 is included in the simulcast zone for that wireless device 110 and has second value (for example, a value of "0") if the corresponding RP 106 is not included in the simulcast zone for that wireless device 110.

Optionally, the QSVs for the wireless devices 110 may be used to conveniently determine if the simulcast zones of two wireless devices 110 do not include any of the same RPs 106. That is, the QSVs for two wireless devices 110 can be used to determine if the simulcast zones for the two wireless devices 110 are disjoint. If this is the case, the simulcast zones for the wireless devices 110 (and the wireless devices 110 themselves) are referred to as being "orthogonal" to each other. This can be done, for example, applying a logical "AND" operation on corresponding elements of the two QSVs.

Each baseband controller 104, RP 106, and/or dynamic sectorization system 120 (and the functionality described as being included therein) can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each baseband controller 104, RP 106, and/or dynamic sectorization system 120 can be implemented in other ways.

Some advantages and/or motivations may be illustrated by the following four scenarios, although the following list is not limiting. First, the user/wireless device 110 density at a deployment site 102 will be different on different days and times of day. For example, if there is a popular rock concert at a venue, there may be too many people (e.g., 4,000 connected users requiring a total of four sectors), while a different event at the same venue may host many fewer (e.g., 500 connected users). In the scenario with only 500 connected users, it is unnecessary to implement four sectors (since having four sectors may unnecessarily introduce inefficiencies associated with four sectors, e.g., increased handovers and inter-sector interference. Instead, a single sector may be sufficient for the 500-user event. Similarly, during peak shopping hours at a retail venue, there may be 4,000 connected users/wireless devices 110, but at other times only 500 connected users. Therefore, statically implementing four sectors (dimensioned statically to suit the worst-case, peak hour) is inefficient because of the issues that come with adjacent sectors, e.g., increased inter-sector handovers and inter-sector interference. In contrast, the dynamic sectorization described herein may adapt to prevailing conditions and change the number of sectors dynamically by "re-homing" the RPs 106 to baseband controllers 104. For example, some or all the RPs 106 may be homed/re-homed to a single baseband controller 104 (single sector) during low-demand periods, while the RPs 106 may be distributed between four different baseband controllers 104 during peak hours (e.g., four sectors).

Second, in contrast to conventional defining of sector boundaries statically during initial configuration/deployment/sectorization, dynamic sectorization may be performed following initial configuration/deployment/sectorization, e.g., in addition to during initial configuration/deployment/sectorization. This may be useful since a large amount of user movement across sector boundaries may occur at different times during the day. By "learning" these patterns, sector boundaries may be dynamically moved to minimize the inter-sector handovers. As mentioned above, moving sector boundaries may include re-homing some of the RPs 106 to a different baseband controller 104 (that serves a neighboring sector).

Third, a particular sector may have a higher user density at different times of day, during which a neighboring sector area may have lower user density. Based on these patterns, one or more RPs 106 may be re-homed to expand the particular sector while shrinking the neighboring sector to adapt to the user density patterns during different times of the day.

Fourth, the radio conditions, user density, and/or user movement patterns at any given time may not match the assumptions made for statically-deployed sectors. For example, the presence of a large number of users in the field-area of the stadium (during a concert) may reduce the inter-sector interference between bowl-area sectors across the field. This is because the interference that occurs via reflection off the ground in the field-area is blocked by the mass of the users. Therefore, dynamic sectorization may be beneficial because it can expand, shrink, and/or otherwise change sector boundaries dynamically (e.g., as directed by higher logic) based on changing radio conditions, user density, and/or user movement patterns to best suit the conditions prevailing at any given point in time.

Figure 1B:
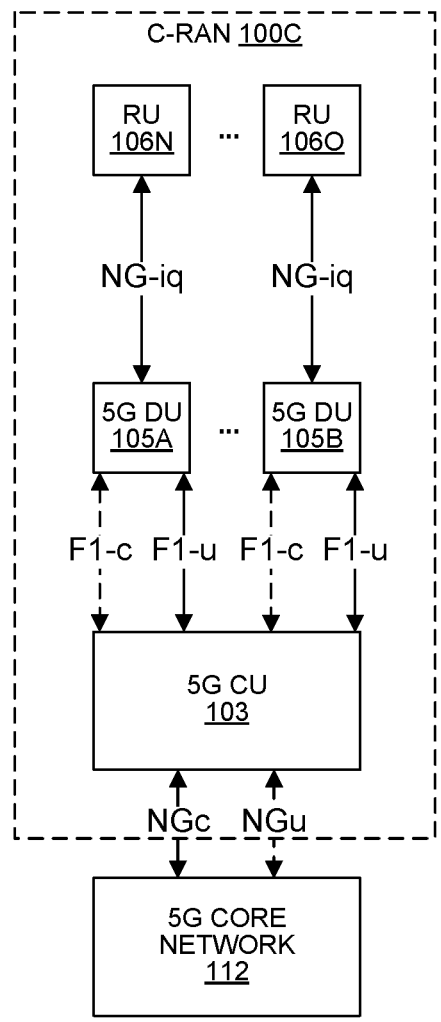
FIG. 1B is a block diagram illustrating another exemplary configuration of a system with a cloud radio access network (C-RAN) that performs dynamic sectorization.

FIG. 1B is a block diagram illustrating another exemplary configuration of a system 100C with a cloud radio access network (C-RAN) that performs dynamic sectorization. The system 100C includes 3GPP Fifth Generation (5G) components. Optionally, the system 100C may additionally include 4G components. Each of the components may be implemented using at least one processor executing instructions stored in at least one memory. In some configurations, at least some of the components are implemented using a virtual machine.

Fifth Generation (5G) standards support a wide variety of applications, bandwidth, and latencies while supporting various implementation options. In the system 100, interfaces denoted with "-c" or simply "c" (illustrated with dashed lines) provide control plane connectivity, while interfaces denoted with "-u" or simply "u" (illustrated with solid lines) provide user plane connectivity. More explanation of the various devices and interfaces in FIG. 1B can be found in 3GPP TR 38.801 Radio Access Architecture and Interfaces, Release 14 (available at https://portal.3gpp.org/desktopmodules/Specifications/SpecificationDetails.aspx?specificationId=3056), which is incorporated by reference herein.

FIG. 1B illustrates a C-RAN 100C implementing an example of a 5G Next Generation NodeB (gNB). The architecture of a Next Generation NodeB (gNB) is partitioned into a 5G Central Unit (CU) 103, one or more 5G Distributed Unit (DU) 105A-B and one or more 5G Remote Units (RU) 106N-O. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105A-B over an interface (including F1-c and F1-u for the control plane and user plane, respectively).

The Distributed Units (DUs) 105 may be nodes that implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) 105 can optionally offload some of its PHY (L1) processing (of the 5G air interface) to RUs 106.

In FIG. 1B, the C-RAN 100C implementing the example Next Generation NodeB (gNB) includes a single CU 103, which handles control plane functions and user plane functions. The 5G CU 103 (in the C-RAN 100C) may communicate with at least one wireless service provider's Next Generation Cores (NGC) 112 using 5G NGc and 5G NGu interfaces. In some 5G configurations (not shown), a 5G CU is split between a CU-C 103B that handles control plane functions and a CU-U 103C that handles user plane functions.

In some 5G configurations, the RUs (RUs) 106N-O may communicate baseband signal data to the DUs 105 on an NG-iq interface. In some 5G configurations, the RUs 106 may implement at least some of the L1 and/or L2 processing. In some configurations, the RUs 106 may have multiple ETHERNET ports and can communicate with multiple switches.

Any of the interfaces in FIG. 1B may be implemented using a switched ETHERNET (or fiber) network. Additionally, if multiple CUs 103 are present (not shown), they may communicate with each other using any suitable interface, e.g., an Xn (Xn-c and Xn-u) and/or X2 interface. A fronthaul interface may facilitate any of the NG-iq, F1-c, and/or F1-u interfaces in FIG. 1B.

Although not shown in FIG. 1B, the system 100C may also include a dynamic sectorization system 120 with a K-means module 122 and a graph partition module 122, which performs the dynamic sectorization functions described herein. In some configurations, the dynamic sectorization system 120 may be communicatively coupled to the 5G CU 103 and/or the 5G core network 112 via an ETHERNET network. Accordingly, where functionality of a baseband controller 104 is discussed herein, it is equally applicable to a 5G CU 103 or 5G DU 105 in 5G configurations. Similarly, where functionality of an RP 106 is discussed herein, it is equally applicable to an RU 106 in 5G configurations. Therefore, where a C-RAN 100 is described herein, it may include 4G components (as in FIG. 1A) and/or 5G components (as in FIG. 1B).

Figure 2:
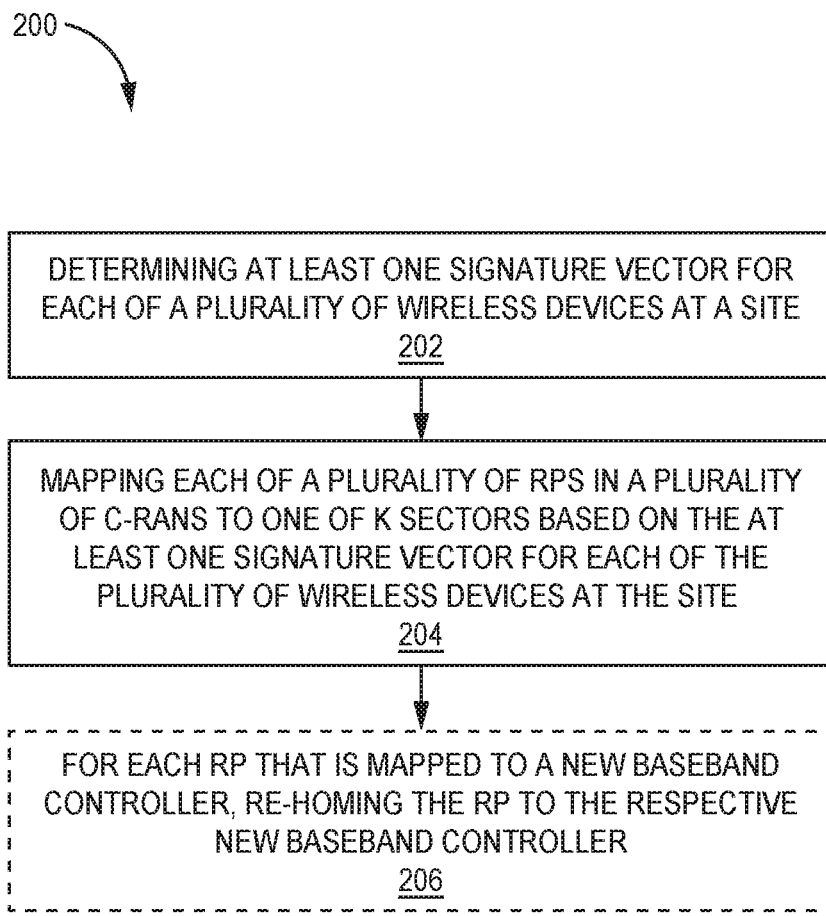
FIG. 2 is a flow diagram illustrating an exemplary method for dynamic sectorization in a multi-sector and/or multi-C-RAN system.

FIG. 2 is a flow diagram illustrating an exemplary method 200 for dynamic sectorization in a multi-sector and/or multi-C-RAN 100 system 101. The method 200 may be performed, at least in part, by a dynamic sectorization system 120 that serves a plurality of C-RANs 100, each C-RAN 100 having multiple RPs 106 and a baseband controller 104. In some configurations, the plurality of RPs 106 for the multiple C-RANs 100 may be deployed at the same site 102 (though the RPs 106 are physically separated from each other within the site 102). The method 200 may also be performed by one or more of the RPs 106 and/or baseband controllers 104 in the multiple C-RANs 100. The method 200 may be performed during runtime based on actual operating conditions in the system 101 (instead of only once during initial sectorization, such as during walk tests before deployment).

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

The method begins at step 202 when at least one signature vector is determined for each of a plurality of wireless devices 110 at the site 102. In one configuration, a signature vector may be determined for each combination of wireless device 110 and RP 106 (that receives wireless signals from the wireless device 110) in the system 101. It should be noted that at least one signature vector may only be determined for wireless devices 110 that are also turned on and communicating wirelessly with at least one of the RPs 106 at the site 102. As mentioned above, each signature vector may be strongly correlated to the physical location of the wireless device 110 within the deployment area (e.g., site 102).

The at least one signature vector may be determined (at a baseband controller 104) based on SRS metric(s), which are determined (at each receiving RP 106) from a wireless signal received from a wireless device 110. SRS metrics may include one or more of the following: (1) an SRS power measurement; (2) a channel impulse response for the wireless device 110, e.g., measured from an SRS; (3) an angle of arrival for the SRS; and/or (4) at least one previous signature vector for the wireless device 110. In some configurations, each signature vector may be determined using the SRS power of an SRS and the channel impulse response for SRS (from a particular wireless device 110), but no other SRS metrics.

The method 200 may proceed at step 204 when the dynamic sectorization system maps each of the plurality of RPs 106 in the plurality of C-RANs 100 to one of K sectors based on at least one signature vector for each of the plurality of wireless devices 110 at the site 102. The mapping may include a K-means module 122 performing K-means clustering (described in FIG. 3 below) or a graph partition module 124 performing graph partitioning (described in FIGS. 4A-4B below). The mapping may be performed after an initial sectorization, e.g., during walk tests before deployment.

In one configuration, either K-means clustering or graph partitioning may be selected based on test results. The advantage of K-means clustering is that it is scalable and machine-learning libraries (e.g., SparkML) that run on big datasets may be utilized. The approach may be selected based on testing with actual field data gathered from different multi-C-RAN 100 systems 101. In one configuration, a system 101 may switch between K-means clustering or graph partitioning during runtime. In another configuration, a system 101 will only ever use one of K-means clustering and graph partitioning, e.g., the selection is only made once.

The method 200 proceeds at optional step 206 when each RP 106 that is being mapped to a new baseband controller 104 is re-homed to the respective new baseband controller 104. The re-homing procedure for an RP 106 may include programming the RP 106 with the IP address of the new baseband controller 104. The re-homing procedure for the RP 106 may also include a handshake procedure (between the RP 106 and the new baseband controller 104) that configures the RP 106 with current operational parameters to use after re-homing is complete. The handshake procedure may include the new baseband controller 104 sending a message (that includes the current operational parameters) to the RP 106 being re-homed to the new baseband controller 104. The RPs 106 may also be enabled as part of the re-homing procedure to start transmitting over the air interface using the current operational parameters.

Figure 3:
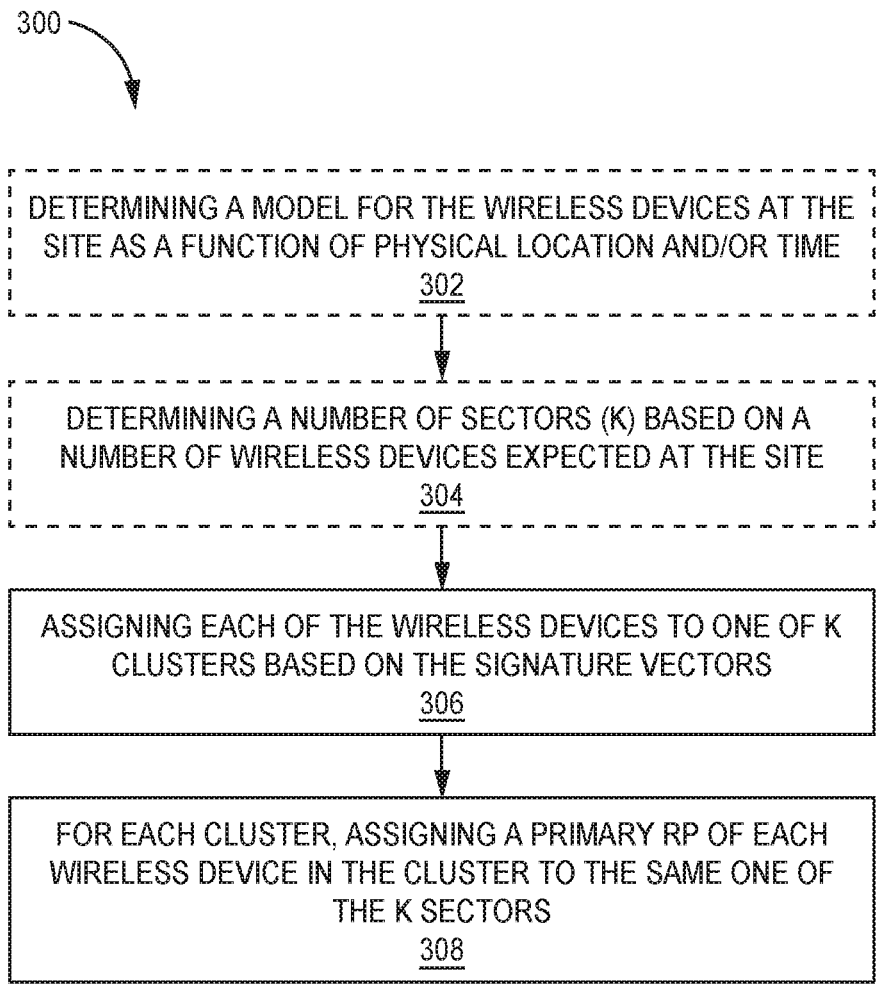
FIG. 3 is a flow diagram illustrating an exemplary method for K-means clustering in a multi-sector and/or multi-C-RAN system.

FIG. 3 is a flow diagram illustrating an exemplary method 300 for K-means clustering in a multi-sector and/or multi-C-RAN 100 system 101. For example, the method 300 may be an example of the mapping in step 204 of the method 200 illustrated in FIG. 2. The method 300 may be performed, at least in part, by a dynamic sectorization system 120 that serves the multiple C-RANs 100, each C-RAN 100 having multiple RPs 106 and a baseband controller 104. The RPs 106 for the multiple C-RANs 100 may be deployed at the same site 102 (though the RPs 106 are physically separated from each other within the site 102). The method 300 may also be performed by one or more of the RPs 106 and/or baseband controllers 104 in the multiple C-RANs 100.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

K-means clustering is an "unsupervised" learning method of machine-learning. K-means clustering involves grouping points into K distinct clusters that can most clearly be separated/isolated from each other, e.g., separated with the least cost. The signature vectors of all the wireless devices 110 (and communicating with at least one RP 106) at the site 102 may be the inputs for the K means clustering, e.g., the signature vectors may be collected in multiple C-RANs 110 covering that deployment at the moment.

The method 300 may begin at optional step 302 when a model is determined for the wireless devices 110 at the site as a function of physical location and/or time. In a first example, a supervised machine-learning model may be used, such as a heat map based on the signature vectors and/or quantized signature vectors for the wireless devices 110. A heat map may model channel conditions, traffic density, user density, and/or user movement patterns as a function of physical location and/or time. For example, the channel conditions experienced by wireless devices 110, their tonnage (e.g., traffic load on the system 100), and/or their behavior may be determined as a function of physical location and time, then aggregated into a heat map. In some configurations, a heat map may be determined only as a function of number of users anywhere within a site 102, e.g., that may be used to predict the number of wireless devices 110 at the site 102 for a given time of a day.

In a second example, a static model may be determined (instead of a supervised machine-learning model). For certain types of sites 102 (e.g., a stadium), the number of users/wireless devices 110 at any given point may be driven via a semi-static policy that defines the type of event and the expected footfalls. A static policy may be configured by the venue owners, C-RAN 100 operators, or any other person or entity.

The method 300 may proceed at optional step 304 when the number of sectors (K) are determined based on a number of wireless devices 110 expected at the site 102. The number of wireless devices 110 expected at the site may be determined using the model. The number of sectors may also be determined based on constraints of the baseband controllers 104 and/or C-RAN 100. This may include dividing the number of wireless devices 110 expected at the site by the capacity per baseband controller 104. For example, if each baseband controller 104 (and therefore, each C-RAN 100) has a max capacity of 1,000 wireless devices 110 and the predicted number of users is 5,000, the number of sectors would be 5,000/1,000=5. If such a calculation does not produce an integer, the quotient may be rounded up to the nearest integer.

It should be noted that, in some configurations, the model and/or the number of sectors (in steps 302 and 304, respectively) may be pre-determined, i.e., not determined specifically as part of the K-means clustering.

K-means clustering may be performed for the system 101 in the remaining steps in FIG. 3. The method 300 may proceed at step 306 when each of the wireless devices 102 (e.g., at the site 102) is assigned to one of K clusters based on at the signature vectors.

For example, the K-means clustering may form K clusters of wireless devices 110 based on the signature vectors such that the clusters are as isolated from one another as possible. This may be done based on the distance from centroid of each cluster (e.g., the center of mass of the physical locations of the wireless devices 110 in the cluster) based on the signature vectors of the wireless devices 110 in space. In other words, since each signature vector is strongly correlated with a physical location of a wireless device 110, the signature vectors may be used as a proxy for physical location when adding the wireless devices 110 to clusters. Every new point (e.g., a wireless device 110 and/or a physical location associated with the wireless device 110) may be joined with the cluster whose centroid is nearest to this new point. After adding each point, the centroid of the cluster to which this new point was added may be re-calculated. The procedure may continue until all points are mapped to one of the K clusters.

The method 300 proceeds at step 308 when, for each cluster, a primary RP 106 of each wireless device 110 in the cluster is assigned to the same one of the K sectors. Therefore, each cluster of wireless devices 110 may be associated with a sector of RPs 106. It is possible that an RP 106 may be the primary RP 106 for wireless devices 110 that are in different clusters. However, an RP 106 may only belong to a single sector. Therefore, if an RP 106 acts as the primary RP 106 for wireless devices 110 in different clusters, it may be assigned to the sector associated with the cluster that includes the largest number of wireless devices 110 for which the RP 106 is the primary RP 106.

Using the method 300, sector boundaries and the number of sectors may be dynamically configured based on the user/wireless device 110 densities and proximities to each other. Furthermore, other mechanisms may be used with the clustering mechanism described herein, e.g., user/wireless device 110 movement patterns. The data needed for the dynamic sectorization may be derived from the signature vectors of all connected users/wireless devices 110 within the multi-C-RAN 100 system 100, e.g., data, such as an SRS, that is gathered every 80 ms to form a constantly-tracked map of precise physical locations and/or movement patterns of wireless devices 110 at the site 102 over time.

As described above, the K-means clustering may be implemented in a machine-learning library (e.g., SparkML) that does "distributed" processing of large datasets and performs the K-means clustering in a distributed manner. Compared to non-distributed solutions, this enables the K-means clustering to be performed using larger data sets, which more accurately forms sector boundaries.

For example, assume the model (supervised machine-learning or static) predicts that five sectors (K=5) are sufficient to meet wireless demand at the site 102 between 3 PM and 4 PM. In that case, typical user density patterns may be gathered over the entire duration of 3-5 PM over several days and form a "typical" user distribution over many days (instead of just relying on some instantaneous snapshots which may lead inaccurate results). The distributed K-means clustering may be performed (using a data cluster) that takes all the data points collected into account (without any limits on the number of data points). Accordingly, a distributed K-means clustering implementation may be more accurate than a non-distributed K-means solution because it can account for large data sets. Such a distributed implementation may also be scalable and run on billions of points very fast.

Figure 4A:
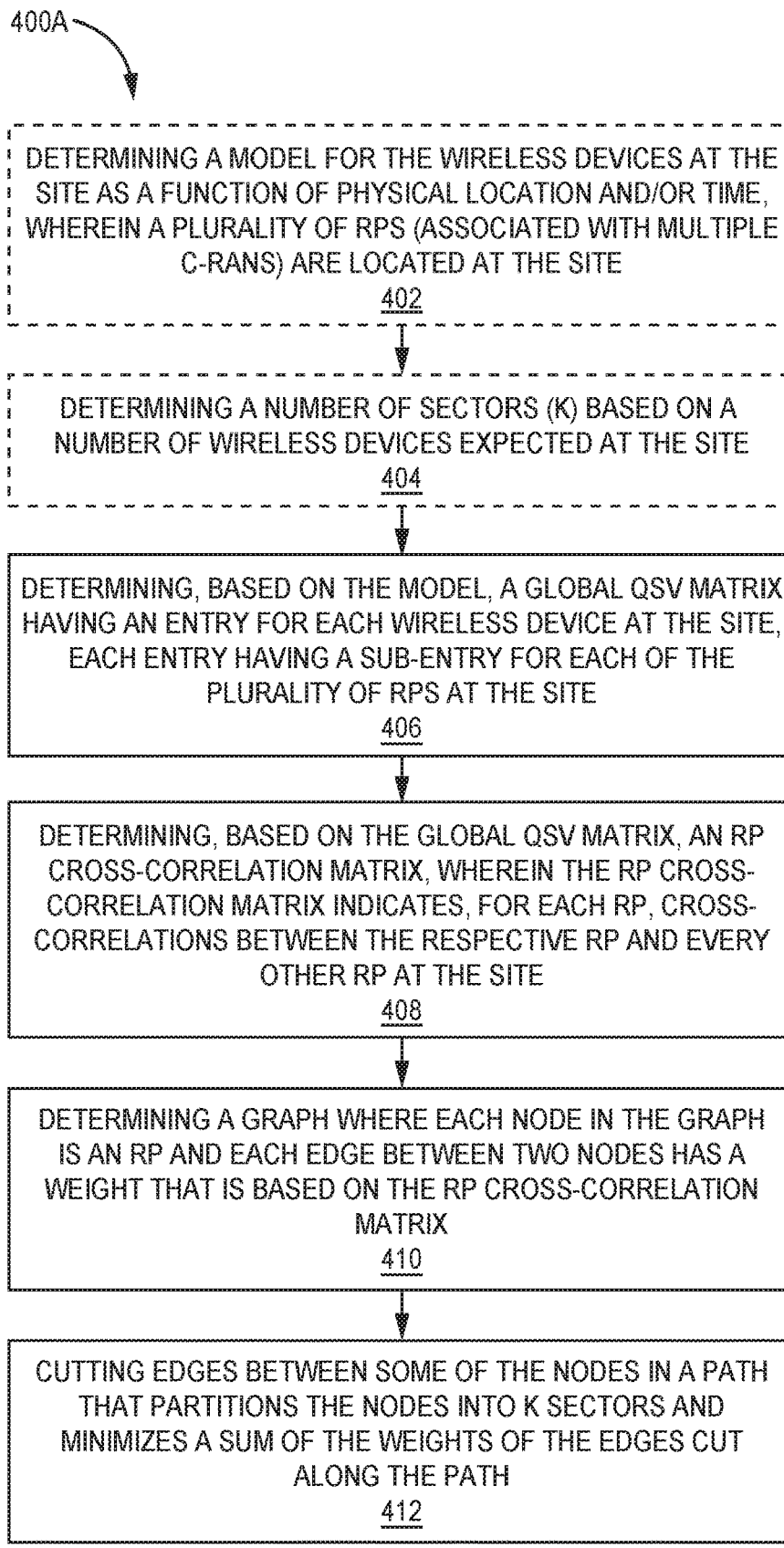
FIG. 4A is a flow diagram illustrating an exemplary method for graph partitioning in a multi-sector and/or multi-C-RAN system.

FIG. 4A is a flow diagram illustrating an exemplary method 400A for graph partitioning in a multi-sector and/or multi-C-RAN 100 system 101. For example, the method 400A may be an example of the mapping in step 204 of the method 200 illustrated in FIG. 2. The method 400A may be performed, at least in part, by a dynamic sectorization system 120 that serves the multiple C-RANs 100, each C-RAN 100 having multiple RPs 106 and a baseband controller 104. The RPs 106 for the multiple C-RANs 100 may be deployed at the same site 102 (though the RPs 106 are physically separated from each other within the site 102). The method 400A may also be performed by one or more of the RPs 106 and/or baseband controllers 104 in the multiple C-RANs 100.

The blocks of the flow diagram shown in FIG. 4A have been arranged in a generally sequential manner for ease of explanation; however, it is to be understood that this arrangement is merely exemplary, and it should be recognized that the processing associated with method 400A (and the blocks shown in FIG. 4A) can occur in a different order (for example, where at least some of the processing associated with the blocks is performed in parallel and/or in an event-driven manner). Also, most standard exception handling is not described for ease of explanation; however, it is to be understood that method 400A can and typically would include such exception handling.

The graph partitioning in FIG. 4A may be an alternative dynamic sectorization approach to K-means clustering. Graph partitioning may form sectors in the system 101 such that the visibility across sectors (the amount a wireless device 110 at a particular physical location will see RPs 106 from different sectors) is minimal, e.g., leading to reduced inter-sector interference and/or reduced magnitude of inter-sector scheduling coordination. The term "see" in the context of an RP 106 is used to refer to the act of detecting signals from the RP 106 and/or detecting signals from the RP 106 that meet one or more signal metric thresholds (e.g., in terms of RMS signal power, signal to interference noise ratio (SINR), signal to noise ratio (SNR), rise over thermal (ROT), interference over thermal (IOT), etc.). For example, the term "see" may refer to detecting signals from the RP 106 that have at least a minimum threshold RMS power, SINR, and/or SNR. Alternatively, the term "see" may refer to detecting signals from the RP 106 that have less than a threshold ROT and/or IOT.

Therefore, FIG. 4A illustrates a method 400A that attempts to perform dynamic sectorization by solving a graph partitioning problem using the signature vectors and/or quantized signature vectors as input (where each QSV having an element for each RP 106 in the C-RAN that is 1 for values above a threshold and 0 for values below the threshold).

Like K-means clustering, however, the graph partitioning in the method 400A may utilize a supervised machine-learning or static model (e.g., that is based on data gathered over many days from the initial deployment in the field) that can predict the average user/wireless device 110 density at a given time in the site 102. The number of sectors needed at the site 102 during a particular time may then be determined based on the predicted user/wireless device 110 density during the particular time. In other words, steps 402-404 in the method 400A of FIG. 4A may be similar to steps 302-304, respectively, in the method 300 of FIG. 3. The remaining steps in the method 400A may utilize graph partitioning to form the sector boundaries.

The method 400A may begin at optional step 402 when a model is determined for the wireless devices 110 at the site as a function of physical location and/or time. In a first example, a supervised machine-learning model may be used, such as a heat map based on the signature vectors and/or quantized signature vectors for the wireless devices 110. In a second example, a static model may be determined (instead of a supervised machine-learning model). It should be noted that, in some configurations, the model and/or the number of sectors (K) (in steps 402-404) may be predetermined, i.e., not determined specifically as part of the graph partitioning.

The method 400A may proceed at optional step 404 when the number of sectors (K) are determined based on a number of wireless devices 110 expected at the site 102. The number of wireless devices 110 expected at the site 102 may be determined using the model (from step 402). The number of sectors may also be determined based on constraints of the baseband controllers 104 and/or C-RAN 100. This may include dividing the number of wireless devices 110 expected at the site by the capacity per baseband controller 104. For example, if each baseband controller 104 (and therefore, each C-RAN 100) has a max capacity of 1,000 wireless devices 110 and the predicted number of users is 5,000, the number of sectors would be 5,000/1,000=5. If such a calculation does not produce an integer, the quotient may be rounded up to the nearest integer.

The method 400A may proceed at step 406 when a global QSV matrix (Q) is determined based on the model (from step 402). As described above, a QSV may be based on at least one signature vector. The global QSV matrix may have an entry (e.g., a QSV) for each wireless device 110 at the site 102, each entry (e.g., a QSV) having a sub-entry for each of the plurality of RPs 106 at the site 102 (and communicating with at least one RP 106 at the site). By way of notation, let $Q_{nUe \times nRP}$ be the matrix of QSVs for all the wireless devices 110 at the site 102 (at the time of sectorization), where nUe is a set of wireless devices 110, e.g., all or a subset of wireless devices 110 at the site 102 and communicating with at least one RP 106; and nRP the number of RPs 106 at the site 102. In one configuration, the QSV of a given wireless device 110 may be determined based on all the RPs 106 in the site 102, possibly across multiple sectors. Such a global QSV matrix can be determined using one or more of the following configurations.

In a first configuration, a per-RP signal-strength/heat-map is available, for example, from RF modelling, simulations (e.g., using IBWave), and/or walk-test data. In this configuration, a global QSV matrix may be determined directly, by determining the minimal set of RPs 106 needed achieve a given average signal-to-interference ratio (SIR).

The minimal set of RPs 106 needed achieve a given average SIR may be determined as part of cell-virtualization and/or smart-reuse procedures in the system 101. Specifically, the relative pathloss from a location in the site 102 to different RPs 106 can be determined from a heat-map and/or walk-test data (SRS measurements). In one configuration, the strongest N RPs 106 may be chosen to serve the location, and the resulting SIR can be calculated from these relative pathlosses. For example, assume there are 2 RPs 106 at pathlosses of 50 dB and 70 dB, respectively, from a location.

Using just the stronger RP 106 would give an SIR of 20 dB (the other RP 106 would constitute (potential) interference).

In a second configuration, once the sectors have gone online, the global QSV matrix may be determined by stitching together QSVs of handover wireless devices 110 across sectors. That is, when a wireless device k is handed over from sector a to sector b, a row entry may be added to the global QSV matrix by logically ORing the sector QSVs, $QSV_{ue=k,sector=a}|QSV_{ue=k,sector=b}$. While this may not give the true global QSV for all wireless devices 110 at the site 102, it should be a reasonable estimate for the wireless devices 110 at sector boundaries, and hence should be helpful in adapting the sector boundaries.

Determination of sector QSV may be performed as part of cell-virtualization and/or smart-reuse procedures in the system 101. In addition to a minimum SIR condition, there are several other considerations (e.g., RP load and/or overall reuse factor of within a C-RAN 100 or the system 101), which play a role in QSV determination. But in general, the RPs closest to a UE (from which we cannot afford to have interference) will form its QSV.

In a third configuration, certain beacon RPs 106 (e.g., with multiple listen modules) may be distributed throughout the site 102. The beacon RPs 106 may decode SRS across all the sectors. By maintaining signature vector databases per sector, indexed by the signature vector values on these beacon RPs 106, the SV/QSV of a wireless device 110 in sectors other than the one it is connected to may be identified (by look-up) in these databases. Finally, the global QSV matrix may be determined by logically ORing the sector QSVs.

The method 400A may proceed at step 408 when an RP cross-correlation matrix (C) may be determined based on the global QSV matrix. The RP cross-correlation matrix may indicate, for each RP 106, a cross-correlations between the respective RP 106 and every other RP 106 at the site 102. Ideally, each $c_{i,j}$ in the RP cross-correlation matrix $\{c_{i,j}\}$ indicates an SRS/SV cross-correlation between RPs 106 i and j. In one configuration, $C=Q^TQ=\{c_{i,j}\}$ where Q is the global QSV matrix.

A large positive value of $c_{i,j}$ indicates that when a wireless device 110 sees RP i strongly, then the wireless device 110 is also highly likely to see RP j also strongly. Additionally, a large positive value of $c_{i,j}$ indicates that when a wireless device 110 does not see RP i, then the wireless device 110 is also highly unlikely see RP j. Conversely, a zero (or near-zero) value of $c_{i,j}$ indicates that when a wireless device 110 sees RP i, then the wireless device 110 is also highly unlikely to see RP j.

So, the RP cross-correlation matrix ($C=\{c_{i,j}\}$) may indirectly indicate how similar the propagation conditions for two RPs 106 are to each other. It should be noted, however, that the entries in the RP cross-correlation matrix may or may not reflect the distance between two RPs 106 because two RPs 106 may be very close to each other but have an obstruction between them, in which case they would not be correlated.

Optionally, the RP cross-correlation matrix used herein may be a normalized version. Normalization may be performed to factor out the particular distribution of wireless devices 110 that formed the RP cross-correlation matrix C, e.g., so that the RP cross-correlation applies better to other distributions of wireless devices 110 in the site. To normalize the rows of C, each row i may be divided by the diagonal element $c_{i,i}$. This "normalized" C should approximate the RP cross-correlation matrix for a uniform distribution of wireless devices 110 with respect to RPs 106.

While C represents QSV-based cross-correlation across RPs 106, normalized C would represent the signal-based cross-correlation across RPs 106. For example, while RPs 106 i and j may be highly correlated in the sense that any wireless device 110 that sees RP i is very likely to see RP j also, there may be very few wireless devices 110 near RPs i and j, that their QSV correlation is comparatively low.

Since signal correlation is likely to change at a much slower rate than wireless device 110 distribution, a normalized C may be averaged over a longer duration. On the other hand, QSV correlation may be a better input for sectorization. In the last example (where any wireless device 110 that sees RP i is very likely to see RP j also, but few wireless devices 110 are near RPs i and j), it may be advantageous to put RPs i and j in different sectors (in spite of their high signal correlation) since only a few wireless devices 110 will be affected.

Thus, it may be useful to 1) maintain a normalized RP cross-correlation matrix over long (e.g., multiple sectorization intervals); and 2) for each sectorization instance, scale this matrix by the current average RP 106 loads (in number of wireless devices 110).

The method 400A may proceed at step 410 when a graph is determined, where each node in the graph is an RP 106 and each edge between two nodes has a weight that based on the RP cross-correlation matrix. In other words, a weighted-edge graph G may be determined using $\{c_{i,j}\}$, where each RP 106 is a node in the graph G and the edge between RPs i and j, has a weight $c_{i,j}$ (from C).

The method 400A may proceed at step 412 when edges between some of the nodes are cut in a path that partitions the nodes into K sectors and minimizes a sum of the weights of the edges cut along the path. In other words, the sectorization problem may be viewed as a ratio-cut problem on G. In addition to minimizing the sum weight of the edges cut, the cutting may also be performed to allocate approximately equal numbers of nodes (RPs 106) in each partition/sector.

Specifically, the cutting may produce a partition of vertices V of G={V, E} into sets U and W, such that $$\frac{E(U, W)}{|U| \times |W|}$$

is minimized, where E(U, W) is the sum weight of the edges cut by the partition, and |U| and |W| are the sizes (number of vertices) of U and W, respectively.

Where the vertices V denote RPs 106 and each edge denotes a cross-correlation between two RPs 106, the cutting may sectorize the RPs 106 at the site 102 such that the sum SRS/SV cross-correlation across sectors is minimized, and the number of RPs 106 in each sector is roughly the same. In one configuration, the cutting may utilize a spectral partitioning method. For example, the cutting may utilize a spectral partitioning method as described in Hagen, Kahng—"New Spectral Methods for Ratio Cut Partitioning and Clustering," IEEE TRANSACTIONS ON COMPUTER-AIDED DESIGN, vol. 11, No. 9, September 1992, which is incorporated herein by reference.

Figure 4B:
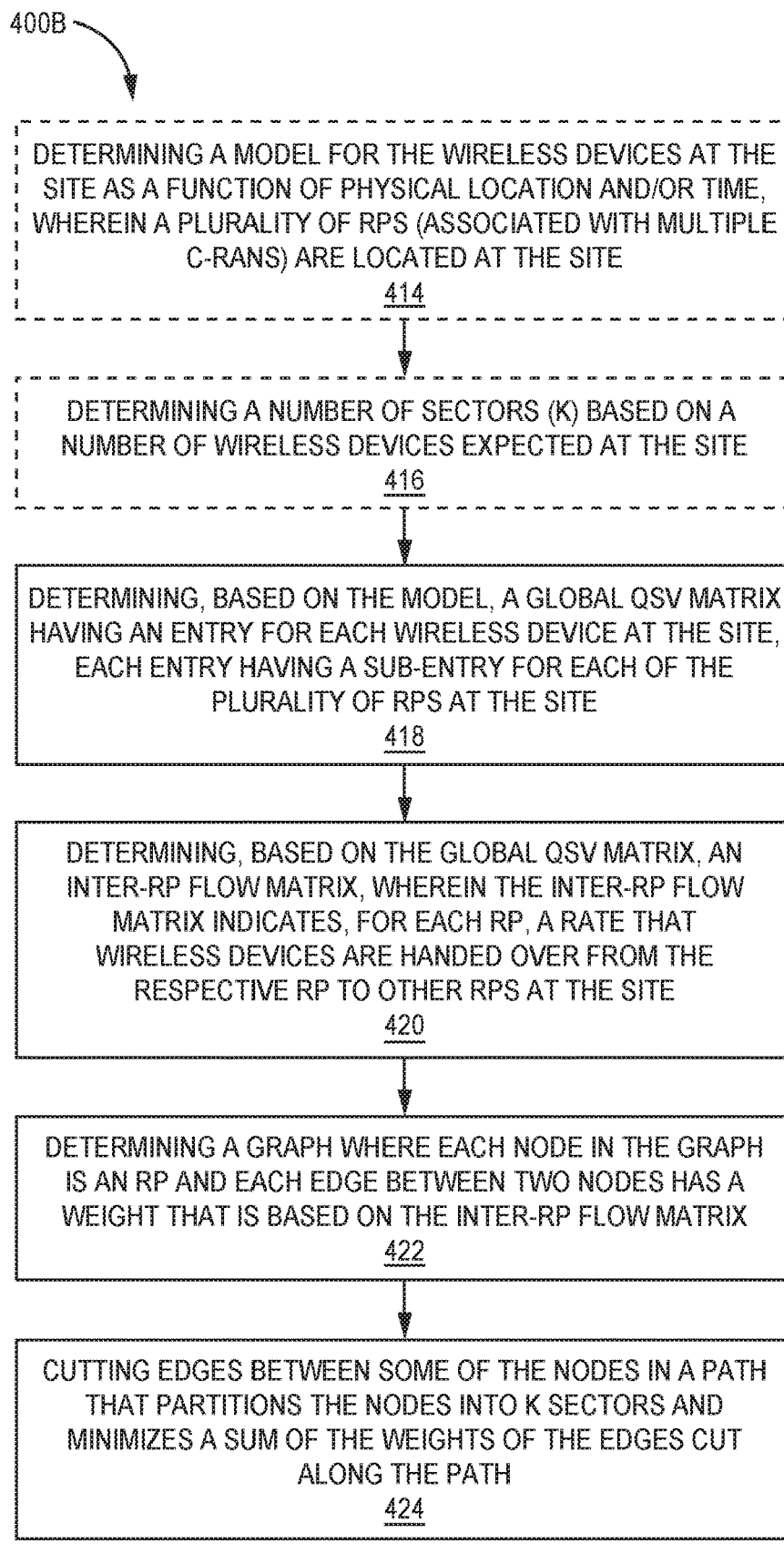
FIG. 4B is a flow diagram illustrating another exemplary method for graph partitioning in a multi-sector and/or multi-C-RAN system.

FIG. 4B is a flow diagram illustrating another exemplary method 400B for graph partitioning in a multi-sector and/or multi-C-RAN 100 system 101. For example, the method 400B may be an example of the mapping in step 204 of the method 200 illustrated in FIG. 2. The method 400B may be performed, at least in part, by a dynamic sectorization system 120 that serves the multiple C-RANs 100, each C-RAN 100 having multiple RPs 106 and a baseband controller 104. The RPs 106 for the multiple C-RANs 100 may be deployed at the same site 102 (though the RPs 106 are physically separated from each other within the site 102). The method 400B may also be performed by one or more of the RPs 106 and/or baseband controllers 104 in the multiple C-RANs 100.

The blocks of the flow diagram shown in FIG. 4B have been arranged in a generally sequential manner for ease of explanation; however, it is to be understood that this arrangement is merely exemplary, and it should be recognized that the processing associated with method 400B (and the blocks shown in FIG. 4B) can occur in a different order (for example, where at least some of the processing associated with the blocks is performed in parallel and/or in an event-driven manner). Also, most standard exception handling is not described for ease of explanation; however, it is to be understood that method 400B can and typically would include such exception handling.

While FIG. 4A describes a method 400 for graph partitioning based on SRS/SV cross-correlation, FIG. 4B illustrates a method 400B for graph partitioning based on flow rate (of wireless devices 110) between RPs 106. However, steps 414-418 in the method 400B illustrated in FIG. 4B may be performed in a similar way as steps 402-406, respectively, in the method 400A illustrated in FIG. 4A.

Following step 418, the method 400B may proceed at step 420 when an inter-RP flow matrix (F={$f_{i,j}$}) may be determined based on the global QSV matrix. However, in contrast to the RP cross-correlation matrix (C) in the method 400A illustrated in FIG. 4A, the inter-RP flow matrix (F) may indicate, for each RP 106, the magnitude of the rate at which wireless devices are handed over from the respective RP 106 (e.g., RP i) to other RPs 106 (e.g., RP j) at the site 102. Therefore, $f_{i,j}$ may be defined as the rate which the primary RP 106 changes from i to j or j to i. Furthermore, in the inter-RP flow matrix (F), $f_{i,j}=f_{j,i}$.

Accordingly, each entry ($f_{i,j}$) in the inter-RP flow matrix (F) may be measured directly within sector, and also across sectors at sector boundaries, by communicating the QSV/primary RP 106 of hand-over wireless devices 110 to the target sector. For example, one way to measure inter-RP flow would be to count the number of wireless devices 110 per minute for which the primary RP 106 changed from RP i to RP j. This means that there is a "flow" of $f_{i,j}$ from RP i to j. If i and j were to fall on different sectors, we could expect to see a hand-over rate proportional to $f_{i,j}$ in that region. In one configuration, $F=Q^TQ=\{f_{i,j}\}$ where Q is the global QSV matrix.

A large positive value of $f_{i,j}$ indicates that when RP i is the primary RP 106 for a wireless device 106, then the wireless device 110 is also highly likely to be handed over to RP j. Conversely, a large negative value of $f_{i,j}$ indicates that when RP i is the primary RP 106 for a wireless device 106, then the wireless device 110 is not very likely to be handed over to RP j.

So, a large positive value of $f_{i,j}$ in the inter-RP flow matrix (F={$f_{i,j}$}) may indirectly indicate that two RPs 106 are relatively physically close to each other. However, two RPs 106 may be physically close but not have a large positive value of $f_{i,j}$ because the RPs 106 may have an obstruction between them, in which case they a wireless device 110 would not be likely to be handed off between them.

Optionally, the inter-RP flow matrix may be normalized. Normalization may be performed to factor out the particular distribution of wireless devices 110 that formed the inter-RP flow matrix F, e.g., so that the inter-RP flow matrix applies better to other distributions of wireless devices 110 in the site. To normalize the rows of F, each row i may be divided by the diagonal element $f_{i,j}$. This "normalized" F should approximate the inter-RP flow matrix for a uniform distribution of wireless devices 110 with respect to RPs 106.

Thus, it may be useful to 1) maintain a normalized inter-RP flow matrix over long (e.g., multiple sectorization intervals); and 2) for each sectorization instance, scale this matrix by the current average RP 106 loads (in number of wireless devices 110).

The method 400B may proceed at step 422 when a graph is determined, where each node in the graph is an RP 106 and each edge between two nodes has a weight that based on the inter-RP flow matrix. In other words, a weighted-edge graph G may be determined using {$f_{i,j}$}, where each RP 106 is a node in the graph G and the edge between RPs i and j, has a weight $f_{i,j}$ (from F).

The method 400B may proceed at step 424 when edges between some of the nodes are cut in a path that partitions the nodes into K sectors and minimizes a sum of the weights of the edges cut along the path. In other words, the sectorization problem may be viewed as a ratio-cut problem on G, similar to step 412 in the method 400A of FIG. 4A. In addition to minimizing the sum weight of the edges cut, the cutting may also be performed to allocate approximately equal numbers of nodes (RPs 106) in each partition.

For example, the cutting may produce a partition of vertices V of G={V, E} into sets U and W, such that $$\frac{E(U, W)}{|U| \times |W|}$$

is minimized, where E(U, W) is the sum weight of the edges cut by the partition, and |U| and |W| are the sizes (number of vertices) of U and W, respectively.

Where the vertices V denote RPs and each edge denotes a flow rate between two RPs 106, the cutting may sectorize the RPs 106 at the site 102 such that the total handover rate across sectors is minimized, and the number of RPs 106 in each sector is roughly the same. In one configuration, the cutting may utilize a spectral partitioning method.

FIGS. 5A-5C are grid diagrams 500A-C illustrating simulations of the graph partitioning described in FIGS. 4A and/or 4B. In the grid diagrams 500A-C of FIGS. 5A-5C, wireless devices 110 were randomly dropped in a simulated site 102 covered by a grid 500 of RPs 106. There are randomly placed high attenuation walls (e.g., walls 502A-B) in FIGS. 5A-5B. The global QSV matrix, Q, may be the only input to the sectorization algorithm, which divides the RPs 106 into K=2 sectors.

For the simulations, $C=Q^TQ$. C gives the edge weights of the graph to be ratio-cut partitioned. Spectral partitioning may be used to obtain the partition in FIGS. 5A-5C. Accordingly, nearby RPs 106 may be grouped together, and sector boundaries may be drawn along the high attenuation walls 502. Also, if there are clusters of wireless devices 110, sectors may generally map to these clusters.

For the simulations, assume that W all$_{Att_k}$=20 dB, and the path loss from wireless device (WD) 110 $i$ to RP 106 $j$ is $$PL(WD = i, RP = j) = 10n\log\frac{d(i, j)}{d_{min}} + \sum_{k \in path(i,j)} \text{Wall\_Att}_k.$$

Here, d(i, j) is the distance between wireless device 110 $i$ and RP 106 $j$, $d_{min}=0.1$, n=propagation constant=3.5, and Wall_Att$_k$=attenuation due to wall k. This (Wall_Att$_k$) is added, if wall K lies in the path from i to j.

Specifically, FIG. 5A is a grid diagram 500A illustrating graph partitioning in a grid 500A with 36 RPs 106 and 100 wireless devices that are uniformly distributed. The line in the grid 500A is a wall 502A (that is unknown at the time of graph partitioning). As a result of the graph partitioning, a first set of RPs 106 are assigned to a first sector, and a second group of RPs 106 are assigned to a second sector. As illustrated in FIG. 5A, the sector boundaries roughly coincide with the wall 502.

FIG. 5B is a grid diagram 500B illustrating graph partitioning in a grid 500B with 72 RPs 106 and 200 wireless devices that are uniformly distributed. The line in the grid 500B is a wall 502B (that is unknown at the time of graph partitioning). As a result of the graph partitioning, a first set of RPs 106 are assigned to a first sector, and a second group of RPs 106 are assigned to a second sector. As illustrated in FIG. 5B, the sector boundaries roughly coincide with the wall 502.

FIG. 5C is a grid diagram 500C illustrating graph partitioning in a grid 500C with 72 RPs 106 and 200 wireless devices that are non-uniformly distributed. Rather, the wireless devices 110 are distributed across only the upper right and lower left quadrants of the grid 500C. As a result of the graph partitioning, a first set of RPs 106 are assigned to a first sector, a second group of RPs 106 are assigned to a second sector, and a third set of RPs 106 are assigned to either sector (e.g., clusters of wireless devices 110 in the grid 500C in the quadrants show up as RP correlations in these quadrants resulting in appropriate sectorization).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

In conclusion, the present disclosure provides novel systems, methods, and arrangements for dynamic sectorization in a system with multiple C-RANs. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

EXAMPLE CONFIGURATIONS

Example 1 includes a communication system, comprising: a plurality of cloud radio access networks (C-RANs), each C-RAN comprising a baseband controller and a plurality of radio points (RPs), wherein each RP in the plurality of C-RANs is located at a site and is configured to exchange radio frequency (RF) signals with a plurality of wireless devices at the site; and a dynamic sectorization system communicatively coupled to each baseband controller, wherein the dynamic sectorization system is configured to: determine at least one signature vector for each of the wireless devices at the site; and map each RP in the plurality of C-RANs to one of a number of sectors (K) based on the at least one signature vector for each of the wireless devices at the site.

Example 2 includes the communication system of Example 1, wherein the dynamic sectorization system is further configured to perform the mapping by: determining a model for the wireless devices at the site as a function of physical location, time or both; and determining the number of sectors (K) based on a number of wireless devices expected at the site.

Example 3 includes the communication system of Example 2, wherein the dynamic sectorization system is further configured to perform the mapping using K-means clustering, wherein the K-means clustering comprises: assigning each of the wireless devices to one of K clusters based on the signature vectors; and for each cluster, assigning a primary RP of each wireless device in the cluster to a same one of the K sectors.

Example 4 includes the communication system of any of Examples 2-3, wherein the dynamic sectorization system is further configured to perform the mapping using graph partitioning, wherein the graph partitioning comprises: determining, based on the model, a global QSV matrix having an entry for each wireless device at the site, each entry having a sub-entry for each of the plurality of RPs at the site; and determining, based on the global QSV matrix, an RP cross-correlation matrix, wherein the RP cross-correlation matrix indicates, for each RP, cross-correlations between the respective RP and every other RP at the site.

Example 5 includes the communication system of Example 4, wherein the graph partitioning further comprises: determining a graph where each node in the graph is an RP and each edge between two nodes has a weight that is based on the RP cross-correlation matrix; and cutting edges between some of the nodes in a path that partitions the nodes into K sectors and minimizes a sum of the weights of the edges cut along the path.

Example 6 includes the communication system of any of Examples 2-5, wherein the dynamic sectorization system is further configured to perform the mapping using graph partitioning, wherein the graph partitioning comprises: determining, based on the model, a global QSV matrix having an entry for each wireless device at the site, each entry having a sub-entry for each of the plurality of RPs at the site; and determining, based on the global QSV matrix, an inter-RP flow matrix, wherein the inter-RP flow matrix indicates, for each RP, a rate that wireless devices are handed over from the respective RP to other RPs at the site.

Example 7 includes the communication system of Example 6, wherein the graph partitioning further comprises: determining a graph where each node in the graph is an RP and each edge between two nodes has a weight that is based on the inter-RP flow matrix; and cutting edges between some of the nodes in a path that partitions the nodes into K sectors and minimizes a sum of the weights of the edges cut along the path.

Example 8 includes the communication system of any of Examples 1-7, wherein, for each RP that is mapped to a new baseband controller, the respective RP is re-homed to the respective new baseband controller.

Example 9 includes the communication system of any of Examples 1-8, wherein each signature vector for a wireless device is determined by a baseband controller based on at least one signal metric, wherein the at least one signal metric is determined at an RP based on a wireless signal received at the RP from the wireless device.

Example 10 includes the communication system of any of Examples 1-9, wherein the at least one signal metric, used to determine a signature vector for the wireless device, comprises one or more of the following: a Sounding Reference Signal (SRS) power measurement that is measured from an SRS received from the wireless device; a channel impulse response, for the wireless device, that is measured from the SRS received from the wireless device; an angle of arrival for the SRS from the wireless device; and at least one previous signature vector for the wireless device.

Example 11 includes a method for dynamic sectorization in a communication system with a plurality of cloud radio access networks (C-RANs), each C-RAN comprising a baseband controller and a plurality of radio points (RPs), wherein each RP in the plurality of C-RANs is located at a site, the method comprising: determining at least one signature vector for each of the wireless devices at the site; and mapping each RP in the plurality of C-RANs to one of a number of sectors (K) based on the at least one signature vector for each of the wireless devices at the site.

Example 12 includes the method of Example 11, wherein the mapping comprises: determining a model for the wireless devices at the site as a function of physical location, time or both; and determining the number of sectors (K) based on a number of wireless devices expected at the site.

Example 13 includes the method of Example 12, wherein the mapping is performed using K-means clustering, comprising: assigning each of the wireless devices to one of K clusters based on the signature vectors; and for each cluster, assigning a primary RP of each wireless device in the cluster to a same one of the K sectors.

Example 14 includes the method of any of Examples 12-13, wherein the mapping is performed using graph partitioning, comprising: determining, based on the model, a global QSV matrix having an entry for each wireless device at the site, each entry having a sub-entry for each of the plurality of RPs at the site; and determining, based on the global QSV matrix, an RP cross-correlation matrix, wherein the RP cross-correlation matrix indicates, for each RP, cross-correlations between the respective RP and every other RP at the site.

Example 15 includes the method of Example 14, wherein the graph partitioning further comprises: determining a graph where each node in the graph is an RP and each edge between two nodes has a weight that is based on the RP cross-correlation matrix; and cutting edges between some of the nodes in a path that partitions the nodes into K sectors and minimizes a sum of the weights of the edges cut along the path.

Example 16 includes the method of any of Examples 12-15, wherein the mapping is performed using graph partitioning, comprising: determining, based on the model, a global QSV matrix having an entry for each wireless device at the site, each entry having a sub-entry for each of the plurality of RPs at the site; and determining, based on the global QSV matrix, an inter-RP flow matrix, wherein the inter-RP flow matrix indicates, for each RP, a rate that wireless devices are handed over from the respective RP to other RPs at the site.

Example 17 includes the method of Example 16, wherein the graph partitioning further comprises: determining a graph where each node in the graph is an RP and each edge between two nodes has a weight that is based on the inter-RP flow matrix; and cutting edges between some of the nodes in a path that partitions the nodes into K sectors and minimizes a sum of the weights of the edges cut along the path.

Example 18 includes the method of any of Examples 11-17, further comprising, for each RP that is mapped to a new baseband controller, re-homing the respective RP to the respective new baseband controller.

Example 19 includes the method of any of Examples 11-18, wherein each signature vector for a wireless device is determined by a baseband controller based on at least one signal metric, wherein the at least one signal metric is determined at an RP based on a wireless signal received at the RP from the wireless device.

Example 20 includes the method of Example 19, wherein the at least one signal metric, used to determine a signature vector for the wireless device, comprises one or more of the following: a Sounding Reference Signal (SRS) power measurement that is measured from an SRS received from the wireless device; a channel impulse response, for the wireless device, that is measured from the SRS received from the wireless device; an angle of arrival for the SRS from the wireless device; and at least one previous signature vector for the wireless device.

The invention claimed is:

1. A communication system, comprising:
a plurality of cloud radio access networks (C-RANs), each C-RAN comprising a baseband controller and a plurality of radio points (RPs), wherein each RP in the plurality of C-RANs is located at a site and is configured to exchange radio frequency (RF) signals with a plurality of wireless devices at the site; and
a dynamic sectorization system communicatively coupled to each baseband controller, wherein the dynamic sectorization system is configured to:
determine at least one signature vector for each of the plurality of wireless devices at the site; and
map each RP in the plurality of C-RANs to one of a number of sectors (K) based on the at least one signature vector for each of the plurality of wireless devices at the site, wherein the dynamic sectorization system is further configured to perform the mapping by:
determining the number of sectors (K) based on a number of wireless devices expected at the site.

2. The communication system of claim 1, wherein the dynamic sectorization system is further configured to perform the mapping by:
determining a model for the plurality of wireless devices at the site as a function of physical location, time or both.

3. The communication system of claim 2, wherein the dynamic sectorization system is further configured to perform the mapping using K-means clustering, wherein the K-means clustering comprises:
assigning each of the plurality of wireless devices to one of K clusters based on the signature vectors; and
for each of the K clusters, assigning a primary RP of each wireless device in the respective cluster to a same one of the K sectors.

4. The communication system of claim 2, wherein the dynamic sectorization system is further configured to perform the mapping using graph partitioning, wherein the graph partitioning comprises:
determining, based on the model, a global QSV matrix having an entry for each wireless device at the site, each entry having a sub-entry for each of the plurality of RPs at the site; and
determining, based on the global QSV matrix, an RP cross-correlation matrix, wherein the RP cross-correlation matrix indicates, for each RP, cross-correlations between the respective RP and every other RP at the site.

5. The communication system of claim 4, wherein the graph partitioning further comprises:
determining a graph with a plurality of nodes, where each of the plurality of the nodes in the graph is an RP and each edge between two nodes has a weight that is based on the RP cross-correlation matrix; and
cutting edges between some of the plurality of nodes in a path that partitions the plurality of nodes into K sectors and minimizes a sum of the weights of the edges cut along the path.

6. The communication system of claim 2, wherein the dynamic sectorization system is further configured to perform the mapping using graph partitioning, wherein the graph partitioning comprises:
determining, based on the model, a global QSV matrix having an entry for each wireless device at the site, each entry having a sub-entry for each of the plurality of RPs at the site; and
determining, based on the global QSV matrix, an inter-RP flow matrix, wherein the inter-RP flow matrix indicates, for each RP, a rate that wireless devices are handed over from the respective RP to other RPs at the site.

7. The communication system of claim 6, wherein the graph partitioning further comprises:
determining a graph with a plurality of nodes, where each of the plurality of the nodes in the graph is an RP and each edge between two nodes has a weight that is based on the inter-RP flow matrix; and
cutting edges between some of the plurality of nodes in a path that partitions the plurality of nodes into K sectors and minimizes a sum of the weights of the edges cut along the path.

8. The communication system of claim 1, wherein, for each RP that is mapped to a new baseband controller, the respective RP is re-homed to the respective new baseband controller.

9. The communication system of claim 1, wherein each signature vector for a wireless device is determined by one of the baseband controllers based on at least one signal metric, wherein the at least one signal metric is determined at an RP based on a wireless signal received at the RP from the wireless device.

10. The communication system of claim 9, wherein the at least one signal metric, used to determine a signature vector for the wireless device, comprises one or more of the following:
a Sounding Reference Signal (SRS) power measurement that is measured from an SRS received from the wireless device;

a channel impulse response, for the wireless device, that is measured from the SRS received from the wireless device;

an angle of arrival for the SRS from the wireless device; and at least one previous signature vector for the wireless device.

11. A method for dynamic sectorization in a communication system with a plurality of cloud radio access networks (C-RANs), each C-RAN comprising a baseband controller and a plurality of radio points (RPs), wherein each RP in the plurality of C-RANs is located at a site and is configured to exchange radio frequency (RF) signals with a plurality of wireless devices at the site, the method comprising:

determining at least one signature vector for each of the plurality of wireless devices at the site; and mapping each RP in the plurality of C-RANs to one of a number of sectors (K) based on the at least one signature vector for each of the plurality of wireless devices at the site, wherein the mapping comprises:

determining the number of sectors (K) based on a number of wireless devices expected at the site.

12. The method of claim 11, wherein the mapping further comprises:

determining a model for the plurality of wireless devices at the site as a function of physical location, time or both.

13. The method of claim 12, wherein the mapping is performed using K-means clustering, comprising:

assigning each of the plurality of wireless devices to one of K clusters based on the signature vectors; and for each of the K clusters, assigning a primary RP of each wireless device in the respective cluster to a same one of the K sectors.

14. The method of claim 12, wherein the mapping is performed using graph partitioning, comprising:

determining, based on the model, a global QSV matrix having an entry for each wireless device at the site, each entry having a sub-entry for each of the plurality of RPs at the site; and determining, based on the global QSV matrix, an RP cross-correlation matrix, wherein the RP cross-correlation matrix indicates, for each RP, cross-correlations between the respective RP and every other RP at the site.

15. The method of claim 14, wherein the graph partitioning further comprises:

determining a graph with a plurality of nodes, where each of the plurality of the nodes in the graph is an RP and each edge between two nodes has a weight that is based on the RP cross-correlation matrix; and cutting edges between some of the plurality of nodes in a path that partitions the plurality of nodes into K sectors and minimizes a sum of the weights of the edges cut along the path.

16. The method of claim 12, wherein the mapping is performed using graph partitioning, comprising:

determining, based on the model, a global QSV matrix having an entry for each wireless device at the site, each entry having a sub-entry for each of the plurality of RPs at the site; and determining, based on the global QSV matrix, an inter-RP flow matrix, wherein the inter-RP flow matrix indicates, for each RP, a rate that wireless devices are handed over from the respective RP to other RPs at the site.

17. The method of claim 16, wherein the graph partitioning further comprises:

determining a graph with a plurality of nodes, where each of the plurality of the nodes in the graph is an RP and each edge between two nodes has a weight that is based on the inter-RP flow matrix; and cutting edges between some of the plurality of nodes in a path that partitions the plurality of nodes into K sectors and minimizes a sum of the weights of the edges cut along the path.

18. The method of claim 11, further comprising, for each RP that is mapped to a new baseband controller, re-homing the respective RP to the respective new baseband controller.

19. The method of claim 11, wherein each signature vector for a wireless device is determined by one of the baseband controllers based on at least one signal metric, wherein the at least one signal metric is determined at an RP based on a wireless signal received at the RP from the wireless device.

20. The method of claim 19, wherein the at least one signal metric, used to determine a signature vector for the wireless device, comprises one or more of the following:

a Sounding Reference Signal (SRS) power measurement that is measured from an SRS received from the wireless device;

a channel impulse response, for the wireless device, that is measured from the SRS received from the wireless device;

an angle of arrival for the SRS from the wireless device; and at least one previous signature vector for the wireless device.

* * * * *